July 20, 1965 D. T. GWILLIM 3,195,791

MAGNETIC TAPE RECORDING AND REPRODUCING APPARATUS

Filed Dec. 26, 1962

4 Sheets-Sheet 1

MAGNETIC TAPE RECORDING AND REPRODUCING APPARATUS

Filed Dec. 26, 1962

July 20, 1965 D. T. GWILLIM 3,195,791

MAGNETIC TAPE RECORDING AND REPRODUCING APPARATUS

Filed Dec. 26, 1962

4 Sheets-Sheet 3

July 20, 1965 D. T. GWILLIM 3,195,791

MAGNETIC TAPE RECORDING AND REPRODUCING APPARATUS

Filed Dec. 26, 1962

4 Sheets-Sheet 4

3,195,791

MAGNETIC TAPE RECORDING AND REPRODUCING APPARATUS

David Thomas Gwilliam, London, England, assignor to Decca Limited, London, England, a British company Filed Dec. 26, 1962, Ser. No. 247,231
Claims priority, application Great Britain, Dec. 27, 1961, 46,333
5 Claims. (Cl. 226—95)

This invention relates to high-speed magnetic tape recording and reproducing apparatus such as may be used, for example, in association with digital data processing apparatus.

In such apparatus, the magnetic tape has to be traversed past a recording and reproducing head system at high speed and has to be started and stopped very quickly but it is not possible to accelerate and decelerate the tape spools on which the tape is wound in the short time available for stopping and starting the tape. It is therefore the practice to have two tape drive capstans, one for each direction of drive, for drawing a length of the tape past the recording and reproducing head system. These capstans are commonly vacuum capstans, that is to say continuously rotating capstans in which vacuum means are provided for holding or releasing the tape from the surface of the capstan as required. For each direction of drive, the appropriate capstan is used to draw the tape past the head system from one tape reservoir and to feed it into a second tape reservoir. The tape feed and take-up spools feed tape into one reservoir and take it out of the other reservoir as required, the feed and take-up spools each being servo-controlled by means responsive to the amount of tape in the associated reservoir. The provision of these tape reservoirs avoids any necessity for high acceleration or deceleration of the spools whilst still permitting rapid acceleration and deceleration of the tape moving past the head system. When the tape is fed from a spool into a reservoir, it is necessary to keep a tension on this part of the tape to ensure that it enters the reservoir. In some cases, vacuum suction can be used in the reservoir to draw the tape in and so to keep it under tension but, in general for a reservoir holding a substantial length of tape, this is not possible and, to maintain the tension and feed the tape into the reservoir from each spool, there is provided, for each spool, an associated tape spool capstan drawing the tape off the spool and feeding it into the mouth of the reservoir. The tape spool capstans are conveniently also vacuum capstans.

According to this invention, in high speed magnetic tape recording and reproducing apparatus, there is provided a tape spool capstan for drawing a tape off a spool and feeding it either directly to a tape drive capstan or into a reservoir, the tape spool capstan comprising a hollow rotatable apertured capstan member with apertures in the surface over which the tape runs and a fixed internal member with apertures connected to a source of vacuum, the apertures in the fixed member extending over that part of the periphery corresponding to the arc over which the tape runs around the tape spool capstan when being fed direct to the tape spool from the tape drive capstan, said apertures in the fixed member being arranged so that the vacuum holds the tape onto the capstan to be driven thereby and said fixed internal member having a further small aperture in a further part of the arc through which the tape runs over the capstan when feeding into the tape reservoir from the tape spool capstan, said further aperture serving to hold down the tape when it is being fed into the reservoir. Conveniently the vacuum is continuously applied to the tape spool capstan as tension is required between each capstan and its associated spool for both directions of tape movement, the spool capstan being rotated with a surface speed faster than the tape speed when tape is drawn off the associated spool but being stopped when tape is being wound on the associated spool. In some cases it may be required to traverse the tape at high speed through the apparatus and, with the arrangement of the present invention, the tape may be fed directly from a drive capstan to the associated tape spool capstan and thence to the spool without passing through the reservoir. The tape spool capstan is a vacuum capstan which can tension the tape both when the tape is being fed directly from the head system to a spool and when it is being fed into or out of the reservoir. The further small aperture in the internal member of the capstan however, ensures that the tape when being fed into or out of the reservoir is held down over the appropriate length of periphery of the tape spool capstan. By using only a small aperture it is readily possible to hold down the tape sufficiently for this purpose without however causing excessive loss of vacuum when the tape is being fed directly through the apparatus without going into the reservoir and therefore does not extend around this part of the capstan.

In one convenient arrangement, when the tape is being fed into a reservoir from a spool, the surface speed of the spool capstan is arranged to exceed that of the moving tape so that the spool drive controls the rate of movement of this part of the tape, the tape spool capstan tensioning the tape and when tape is being fed out of a reservoir onto a spool, the tape spool capstan is kept stationary so that it applies tension to the tape, the movement of which is controlled by the spool drive. It is possible to maintain a substantially constant tension under all conditions of speed and direction of tape movement.

In high speed magnetic tape recording and reproducing apparatus, it is generally required that the tape can be moved as necessary in either direction and for this reason a symmetrical drive system is employed. In such arrangement very conveniently the tape from one spool passes over a tape spool capstan thence either downwards into and upwards out of the reservoir or directly past the first tape drive capstan to the head system. The tape after leaving the head system passes over a tape drive capstan thence either directly to the tape spool capstan or downwardly into a reservoir and up again to the tape spool capstan. From the tape spool capstan, the tape then passes to the tape spool.

Conveniently for a fast wind of the tape onto a spool, the tape is fed directly onto the leading spool over the associated tape spool capstan without passing into and out of the associated reservoir so that the speed of the leading spool controls the movement of the tape. From the trailing spool the tape preferably passes over the associated tape spool capstan and into and out of the adjacent reservoir so that the servo system controls the trailing spool in accordance with the amount of tape in the reservoir and the tape spool capstan for the trailing spool keeps the tension on this part of the tape.

The following is a description of one embodiment of the invention reference being made to the accompanying drawings in which.

Figure 1:
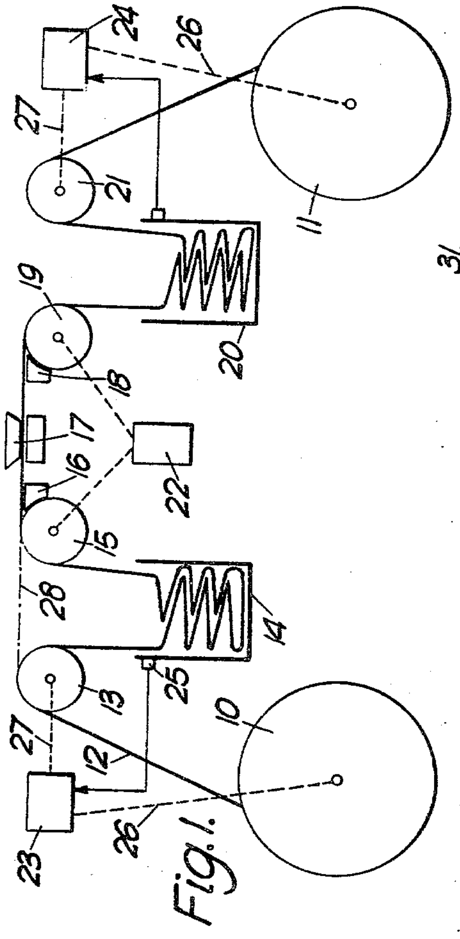
FIGURE 1 is an explanatory diagragm for explaining the general arrangement and operation of a high-speed magnetic tape unit for use with digital data processing apparatus.

FIGURE 1 illustrates diagrammatically a high-speed tape unit such as might be used with digital data processing apparatus. The unit of FIGURE 1 is symmetrical so that the tape can be moved in either direction past the head for writing on the tape or reading from the tape. Two tape spools 10, 11 are provided, the tape 12 being drawn from one spool and wound on the other. In passing from the spool 10 to the spool 11, the tape 12 is taken over a first capstan 13 which will be referred to as the left-hand tape spool capstan and thence into a tape reservoir 14. From the reservoir 14 the tape extends over a tape drive capstan 15 and thence over a back tensioning block 16 and past the recording and reproducing heads 17. The high-hand half of the unit of FIGURE 1 is similar to the left-hand half, the tape extending from the heads 17 over a back tensioning block 18 and a tape drive capstan 19 into a tape reservoir 20. From the tape reservoir 20 the tape extends over a further capstan 21 referred to as the right-hand tape spool capstan and thence on to the spool 11. In this particular unit the two tape drive capstans 15, 19 are conveniently of the type described and claimed in co-pending U.S. application No. 177,477 and reference may be made to the specification of that application for a fuller description of these capstans. For the present, it will suffice to say that these are vacuum capstans which are continuously rotated in opposite directions by means of an electric motor 22. The tape is driven in one or other direction by applying vacuum from a vacuum source to the appropriate capstan so that the tape is held in contact with that capstan and is driven thereby but passes freely over the other capstan. The directions of rotation of these two capstans are such that each tends to draw the tape way from the heads 17. The back tensioning units 16, 18 are guide blocks of the kind described and claimed in co-pending United States application Serial No. 244,071, filed December 12, 1962, entitled "Apparatus for Handling Strips of Flexible Material" in which vacuum suction is applied to the tape through apertures in a guide block so as to draw the tape down onto the block and so apply a tension to the tape no matter in which direction the tape is moving. The tape has to be drawn past the heads 17 in accordance with the requirements of the data processing system with which the unit is associated and the data processing apparatus therefore controls the application of the vacuum to these two capstans. In normal operation, the tape passing the heads has frequently to be stopped and started in accordance with the requirements of the data processing system. In order to ensure rapid acceleration and deceleration of the portion of the tape passing the heads, the amount of tape to be accelerated and decelerated must be kept to a minimum and the requisite tape is drawn from one of the reservoirs 14 or 20 according to the required direction of movement and the tape is fed from the tape drive capstan 19 or 15 into the other reservoir. These reservoirs 14 and 20 provide temporary storage for the portion of tape about to be drawn or which has been drawn past the heads. Preferably these reservoirs 14 and 20 are of the form described and claimed in United States application Serial No. 266,713, filed March 20, 1963, entitled "Tape Handling Apparatus." By using these reservoirs 14 and 20, the tape spools 10, 11 need not be rapidly accelerated and decelerated in accordance with the requirements of the data processing apparatus but have only to be controlled to ensure that there is always some, but not too much, tape in each of the two reservoirs. The tape spools 10, 11 are controlled respectively by servo systems 23, 24 including electric motors for driving the spools as indicated by the dashed lines 26. The servo systems are controlled by photoelectric sensing means 25, 26 respectively so that the spool drive motors are driven in accordance with the amount of tape in the respective tape reservoirs 14, 20. These servo system motors also drive the capstans 13, 21 as indicated diagrammatically by the lines 27. These capstans 13, 21, which will be described in much fuller detail later, are vacuum capstans and serve not only for driving the tape into a reservoir but also for keeping the portion of the tape between the spool and spool capstan under tension. As tape is wound on or drawn off one of the spools 10, 11, the effective diameter of the spool will therefore increase or decrease. The linear speed of the tape passing onto or off a spool depends not only on the speed of rotation of the spool but also on the amount of tape on the spool. Considering tape being drawn off the spool 10, the servo system 23 controls the spool drive to ensure that the requisite amount of tape is fed into the reservoir. The tape spool capstan 13, with vacuum suction applied, is rotated continuously at a speed such that the surface speed of the capstan exceeds that of the moving tape. The tape slips on the capstan which thus applies a tension to the tape. The drive to the spool 10 thus controls the rate of movement of the tape whilst the tape spool capstan serves to apply tension to the part of the tape being drawn off the spool. The speeds of the spool 10 and the spool capstan 13 need not therefore be related provided that whatever the diameter of the tape on the spool 10, the surface speed of the spool capstan 13 is sufficient to put the necessary tension on the tape being drawn off the spool. When tape is being fed out of a reservoir, for example out of the reservoir 14 on to the spool 10, the associated tape spool capstan 13 is kept stationary. As previously mentioned, this spool capstan however is a vacuum capstan and the vacuum is kept applied so that a back tension is put on the tape which is drawn over the capstan by the rotation of the spool 10. The tape speed, as before, is controlled by the servo-system and spool drive. It will be seen therefore that the two tape spool capstans 13, 21 not only drive the tape into the associated reservoir but also fulfill the function of keeping a constant tension on the portion of the tape between each capstan and the associated spool.

In high speed magnetic tape recording units for use with digital data processing apparatus, very long lengths of tape are commonly used and it is desirable therefore to be able to have a fast wind of the tape from one spool on to the other. For this purpose it is desirable to drive the spool onto which the tape is to be wound, for example, spool 10, at the requisite high speed so that the speed of this spool controls the movement of the tape. The tape is therefore passed directly from the capstan 15 over the capstan 13 as indicated by the chain line 28 and thence on to the leading spool 10. The capstan 13, as before, serves to maintain tension on the part of the tape between this capstan and the spool 10. The four capstans 13, 15, 19, 21 are arranged in line so that the tape will pass tangentially across the capstan 15 which therefore does not have any effect on the condition of operation. The tape passes around the capstan 19 slipping over this capstan which may be used to apply back tension to the tape. The trailing spool 11, because the amount of tape wound on it will in general differ from the amount wound on the spool 10, will have to rotate at a different speed from the spool 10 and has therefore to be servo controlled. The tape from the spool 11 is therefore lead as before over the capstan 21, and into the tape reservoir 20 before passing over the capstan 19 and the servo system 24 is employed to control the trailing spool 11 in accordance with the amount of tape in the reservoir 20. The capstan 21 in this case will, as in normal operation of the tape unit, serve to apply tension to the portion of the tape between this capstan and the spool 11. For fast wind in the opposite direction, that is, when tape is to be wound on to the spool 11 from the spool 10, the tape would be taken straight from the capstan 19 to the capstan 21 without passing through the reservoir 20 whilst the spool 10 would be controlled by the servo system 23 in accordance with the amount of tape in the reservoir 14.

The present invention is more particularly concerned with the tape spool capstans and their associated equipment.

Figure 5:
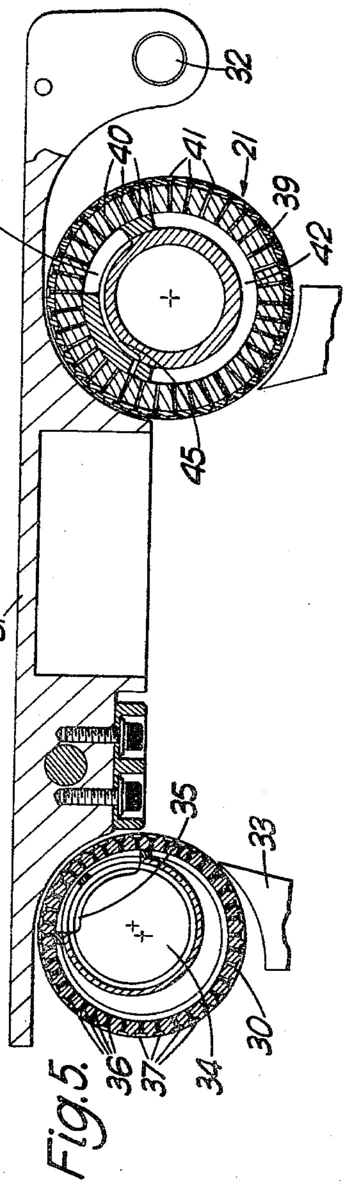
FIGURE 5 is a section along the line 5—5 of FIGURE 4 but showing only those parts of the capstans necessary for explaining their construction and operation.
Figure 2:
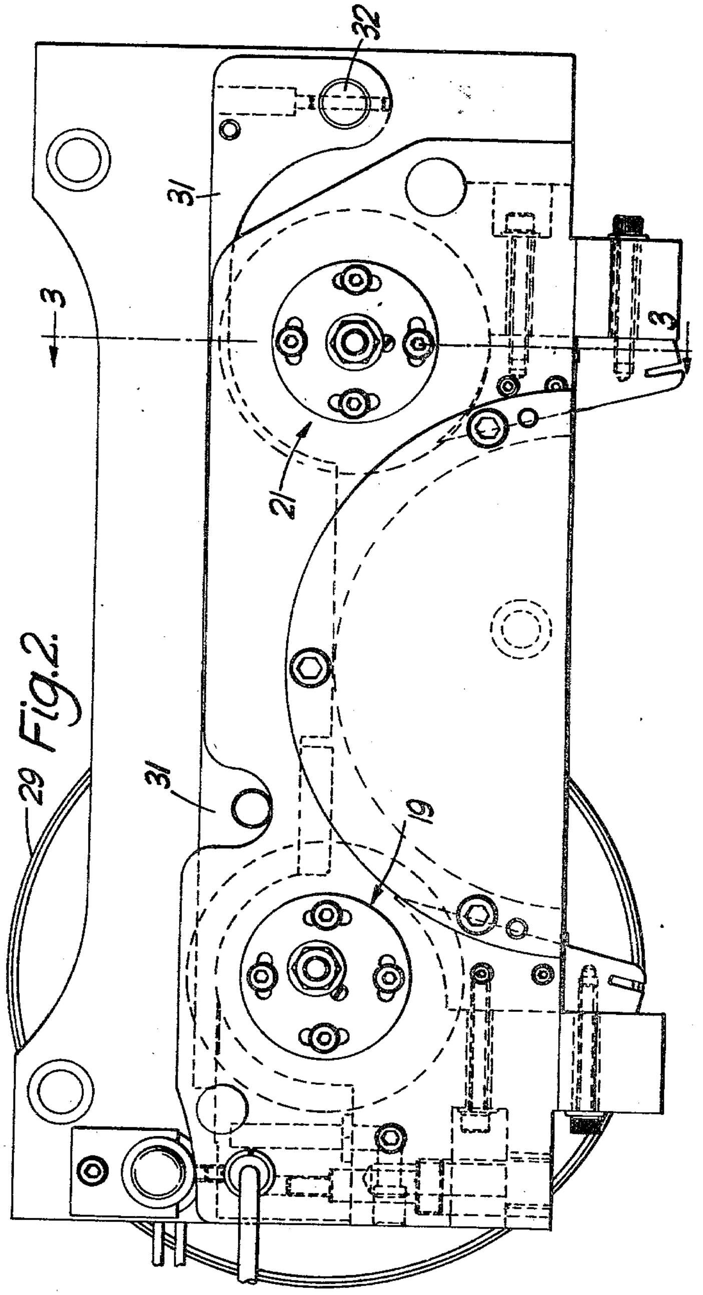
FIGURE 2 is an elevation showing one of the capstan assemblies embodying two vacuum capstans used in the tape unit of FIGURE 1.
Figure 4:
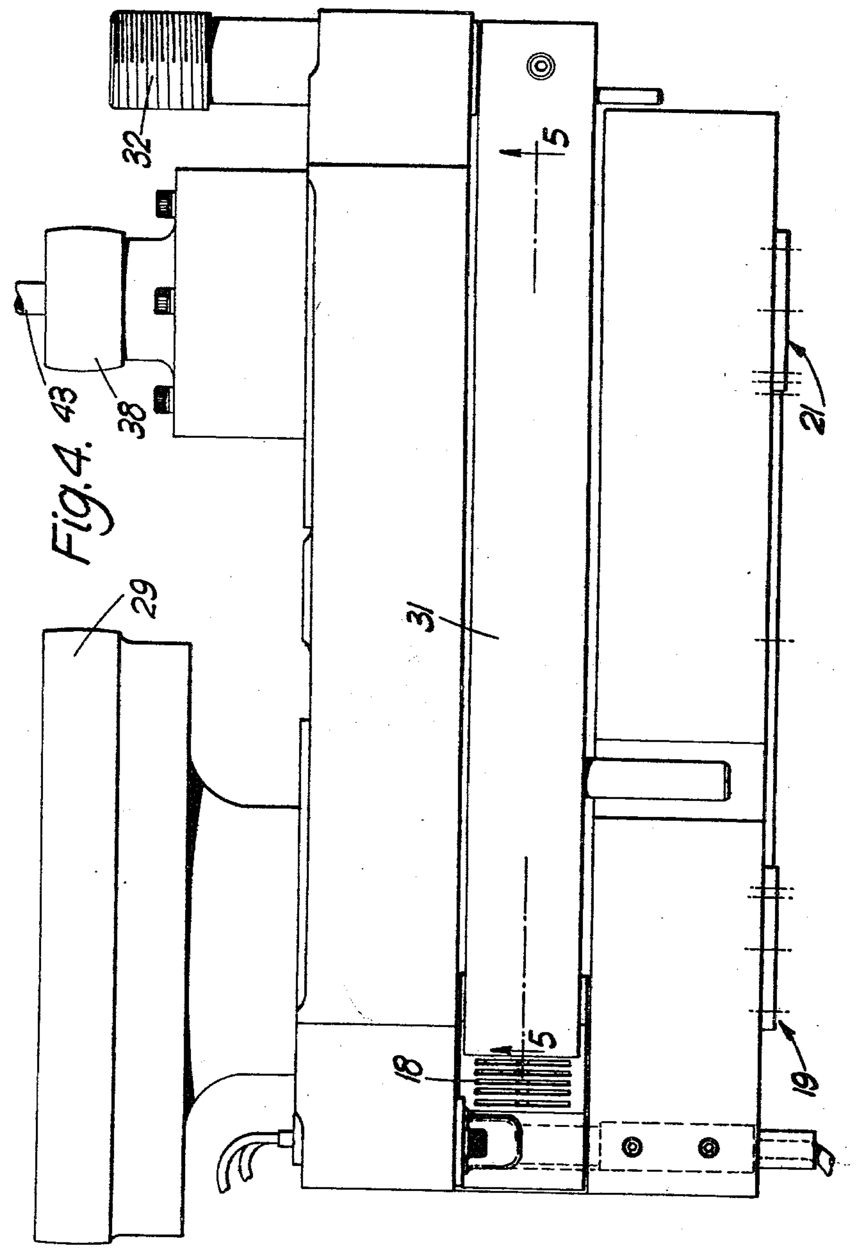
FIGURE 4 is a plan view of the capstan assemblies of FIGURE 2.

FIGURE 2 is a front elevation of the right-hand capstan assembly containing the capstans 19, 21 of FIGURE 1. This assembly is shown in plan in FIGURE 4 and in sectional elevation in FIGURE 5. As is clearest from FIGURE 5, the capstan 19 has a continuously rotating capstan member 30 which is of generally cylindrical form. The tape lies over this member 30 underneath a movable bridge member 31 which is pivotally mounted on a pivot 32 so as to be capable of being lifted up away from the capstan member 30 when the tape is to be threaded through the assembly or when it is to be passed directly from the capstan 19 to the capstan 21. When the tape is passing from the capstan 19 into the tape reservoir 20 the tape in the capstan assembly extends around the capstan member 30 over an arcuate extent of slightly more than 90°. The vacuum capstan 19 is of the type described and claimed in the specification of the aforementioned U.S. application No. 177,477 and reference may be made to that specification for a fuller description of the capstan. In the following, reference will only be made to those features of the capstan necessary for explaining the present invention. The capstan member 30 is driven in the clockwise direction as seen in FIGURES 1 and 5 by means of a belt drive onto a pulley 29 (FIGURE 4). A stripper 33 (FIGURE 5) is provided to ensure that the tape is guided away from the capstan member 30 at the appropriate point around the periphery thereof. This particular capstan member, as previously explained, is arranged for driving the tape in one direction only but the tape may be pulled over this capstan when moving in the opposite direction. Within the rotatable capstan member is a solenoid-operated valve assembly which is described in the specification of the aforementioned U.S. application No. 177,477. For the present purposes, it will suffice to say that this valve assembly shown at 34 in FIGURE 5 has an outer surface of generally cylindrical form and contains a solenoid-operated valve for applying vacuum to a region 35 extending over an arc corresponding to the arc with which the tape embraces the capstan so that the vacuum suction is applied to the tape around this arc through aperture 36 in the capstan member 19. These apertures 36 are in the form of radial extending holes through the capstan member 19 along the circumferential line corresponding to the centre line of the tape. The apertures lead into transverse grooves 37 extending across the width of the capstan member on the outer surface thereof.

The tape spool capstan 21 is driven by a pulley 38 (FIGURES 3 and 4) consists of a cylindrical capstan member 39 (FIGURES 3 and 5) which is continuously rotated and which has a series of apertures 40 extending in a radial direction from the interior of the cylindrical member 39 leading into grooves 41 extending transversely across the width of the capstan member 21. As previously explained, in normal operation, vacuum is continuously applied to the capstan 21. The capstan 21 contains a stator 42 connected to a source of vacuum via a pipe 43 (FIGURE 3) by means of which vacuum is applied to a chamber 44 (FIGURE 5) in the stator 42. The vacuum so applied to the chamber 44 serves to hold the tape down on to the capstan member 39. When the latter is rotating, as previously explained, it is driven at a speed faster than the rate at which the tape is being drawn off the tape spool so as to apply tension to the tape being drawn off the associated spool and to feed it into the reservoir. When the tape is being fed on to the spool, the capstan member 39 does not rotate and the vacuum suction applied via the chamber 44 and the apertures 40 and grooves 41 tends to hold the tape on to the capstan member so applying back tension to the tape.

The chamber 44 extends only around the inside of that part of the capstan member 39 over which the tape extends when the tape is passing from the spool around the capstan member 39 directly to the tape drive capstan 19. This vacuum suction is effective for applying back tension to the tape both during normal operation (and during fast wind onto spool 10) when the tape passes through the associated reservoir 20 and also during fast wind onto the spool 11 when the tape does not go through the reservoir 20. When the tape is passing into or out of the reservoir, it has however to be held down over a larger arcuate extent of the capstan member 39 in order to ensure that, at the very high linear tape speeds possible with this type of apparatus, the tape runs correctly. For this purpose, a duct 45 is provided leading from the vacuum chamber 44 to a fixed point inside that part of the periphery of the capstan member 39 over which the tape passes when it is being fed into or out of the reservoir 20. The duct 45 is of small section which is, however, sufficient to hold down the tape on the capstan member 39 when the tape is being fed into or out of the reservoir 20. By using only a small section duct it is readily possible to hold down the tape sufficiently for this purpose without however causing excessive loss of vacuum when the tape is being fed directly through the apparatus between the capstans 19 and 21 without going into the reservoir 20.

Figure 3:
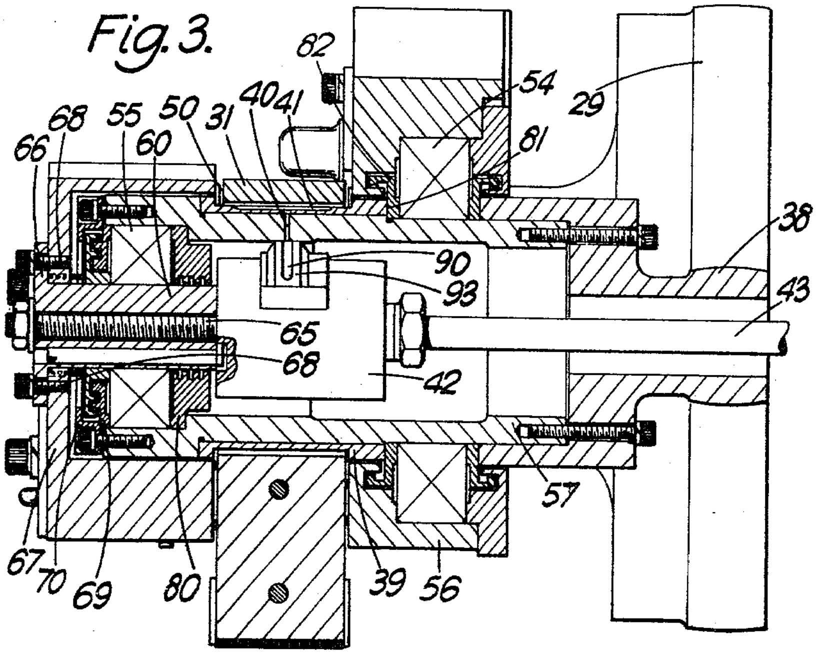
FIGURE 3 is a section through one of the capstans of FIGURE 2 along the line 3—3.

The construction of the capstan 21 is shown in more detail in FIGURE 3. The tape lies over the capstan member 39 within a groove 50 underneath the movable bridge member 31. The rotatable capstan member 39 is mounted on two bearings 54, 55. For convenience of terminology the bearing 54 will be referred to as the rear bearing and the bearing 55, which is nearer the front of the assembly, as the front bearing. The rear bearing 54 supports the capstan member 39 within an outer fixed mounting member 56. The capstan member 39 extends rearwardly through the bearing 54 and beyond this bearing is secured by a sleeve 57 to the drive pulley 38. The front bearing 55 fits in the open front end of the capstan member 39 and supports the capstan member on a spigot 60 which is a mount for a fixed assembly inside the capstan member and containing the stator 42. The stator 42 has an outer surface of generally cylindrical form and extending out of one end of the stator is the aforementioned tube 43 leading to the source of vacuum. The stator 42 is threaded to receive a bolt 65 which passes through a bore through the spigot 60, the head of the bolt bearing against a flange 66 on the spigot 60, which flange overlaps part of a front plate 67 formed integrally with aforementioned fixed member 56 so that the stator 42 is secured rigidly to the fixed part of the structure of the apparatus. The stator 42 is withdrawable through the back bearing 54 after unscrewing the bolt 65. The aforementioned flange 66 is secured by bolts 68 to the plate 67. A ring 69 secured by a cap 70 presses the front bearing 55 against an abutment member 80 located within the capstan member 39 and constitutes part of a dust-excluding labyrinth. A shoulder 81 on the outer surface of the capstan member 39 applies the axial thrust to a further thrust ring 82 and thus to the back bearing 54. There is thus no axial play in the two bearings 54, 55.

Around the periphery of the capstan member 39 along the centre line of the base of the groove 50 are the aforementioned apertures 40. These apertures extend radially through the capstan member 39 and extend from the interior of the capstan member into the bases of the shallow grooves 41 which extend in the axial direction of the capstan for part of the width of the main groove 50. The tape to be driven sits on the base of the main groove 50 and the shallow grooves 41 serve to distribute the vacuum or air pressure applied through the holes 40 across nearly the whole width of the tape. The grooves 41 and holes 40 are evenly spaced around the whole periphery of the capstan member 39.

The stator 42 is of substantially cylindrical form and has a slot 90 extending over the part of the periphery of the assembly over which the tape is to be maintained in contact with the capstan member 39 when the tape passes directly between capstans 19 and 21. Around this part of the stator 42 is a carbon member 93 the surface of which is slightly proud of the general cylindrical surface of the assembly 42. The slot 90 lies in the same radial plane as the aforementioned holes 40 so that, as these holes pass over the slot in the stator, vacuum suction is applied through the holes 40 to the underside of the tape as it passes over the capstan. The capstan member 39 can rub against the carbon member 93 to provide a substantially airtight seal for the connection between the slot in the stator 42 and the aforementioned holes 40. The aforementioned duct 45 also extends through the carbon member 93 and serve to apply vacuum to the holes 40 as they pass over the end of this duct, that is to say at a point in the further arc over which the tape is to be held down when it is passing into or out of the tape reservoir.

I claim:

1. A tape spool capstan for drawing tape off a spool and feeding it either directly to a tape drive capstan or into a reservoir, wherein the tape spool capstan comprises a hollow rotatable apertured capstan member with apertures in the surface over which the tape runs and a fixed internal member with a chamber connected to a source of vacuum, the chamber in the fixed member extending over that part of the periphery corresponding to the arc over which the tape runs around the tape spool capstan when being fed direct to the tape spool from the tape drive capstan, said chamber in the fixed member being arranged in this arc so that the vacuum holds the tape into the tape spool capstan over this arc and said fixed internal member having an aperture of less cross-sectional area than said chamber in a further part of the arc through which the tape runs over the capstan when feeding into the tape reservoir from the tape spool capstan, said further aperture being connected to said source of vacuum to hold the tape onto the capstan when the tape is being fed into the reservoir.

2. A tape spool capstan as claimed in claim 1 wherein the apertures in the capstan member comprise transverse slots extending across the width of the capstan.

3. A tape handling unit comprising first and second spools with a tape passing between the spools, the ends of the tape being wound on the spools, first and second tape spool capstans associated respectively with the two spools for drawing tape off the associated spool, first and second tape reservoirs into which is fed tape from the respective tape spool capstans, first and second tape drive capstans arranged to engage the tape between the two reservoirs, the first tape drive capstan being arranged for drawing tape from the second reservoir over the second tape drive capstan and feeding it to the first reservoir and the second tape drive capstan being arranged for drawing tape from the first reservoir over the first tape drive capstan and feeding it to the second reservoir, drive means for the tape spool capstans arranged to rotate the first tape spool capstan with a surface speed faster than the tape speed when the tape is being drawn off the first spool and to rotate the second tape spool capstan with a surface speed faster than the tape speed when the tape is being drawn off the second spool, control means arranged to control the tape spool capstans to hold the first stationary when tape is being wound onto the first spool and to hold the second stationary when tape is being wound onto the second spool, and wherein the tape spool capstans are each arranged so that tape can pass from each tape spool capstan to the tape drive capstans either directly or through one of said first and second reservoirs and wherein each tape spool capstan comprises a hollow rotatable apertured capstan member with apertures in the surface over which the tape runs and a fixed internal member with chamber connected to a source of vacuum, the chamber in the fixed member extending over that part of the periphery corresponding to the arc over which the tape runs around the tape spool capstan when being fed direct to the associated tape spool from the tape drive capstans, said chamber in the fixed member being arranged in this arc so that the vacuum holds the tape onto the tape spool capstan over this arc and said fixed internal member having a further small aperture in a further part of the arc through which the tape runs over the tape spool capstan when feeding into a tape reservoir from the tape spool capstan, said further aperture being connected to a source of vacuum to hold the tape onto the capstan when the tape is being fed into a reservoir from the tape spool capstan.

4. A tape handling unit as claimed in claim 3 wherein the two tape drive capstans and two tape spool capstans have parallel horizontal axes and wherein the reservoirs are located below the axes of the drive and spool capstans.

5. A tape handling unit as claimed in claim 4 wherein there are provided two gates, one extending across the first tape drive capstan and the first tape spool capstan and the other extending across the second tape drive capstan and second tape spool capstan, each of which gates is pivotally mounted to be swung upwardly to enable the tape to be drawn from a spool straight over the spool capstan and thence either directly over the drive capstan or into and out of the reservoir between the two capstans.

References Cited by the Examiner

UNITED STATES PATENTS

| | | | |
|---|---|---|---|
| 3,071,332 | 1/63 | Dain et al. | 226—95 X |
| 3,097,778 | 7/63 | Pendleton | 226—95 |

ROBERT B. REEVES, *Primary Examiner.*

ANDRES H. NIELSEN, SAMUEL F. COLEMAN, *Examiners.*